June 6, 1950  R. W. BERRY  2,510,769
FISHING LURE
Filed Nov. 1, 1945
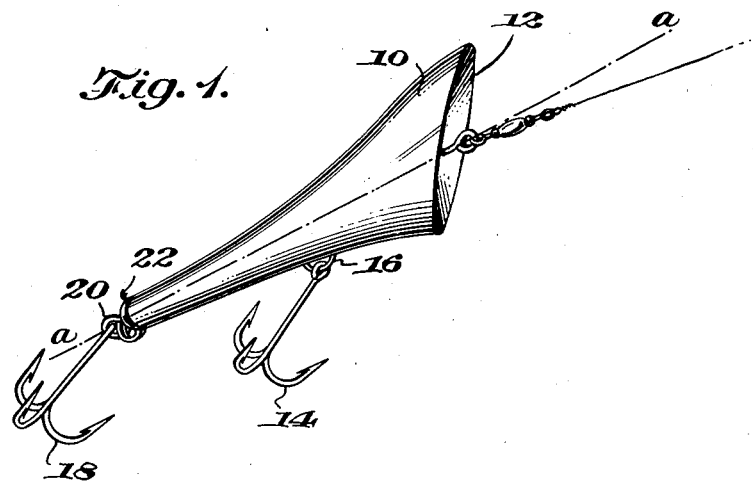
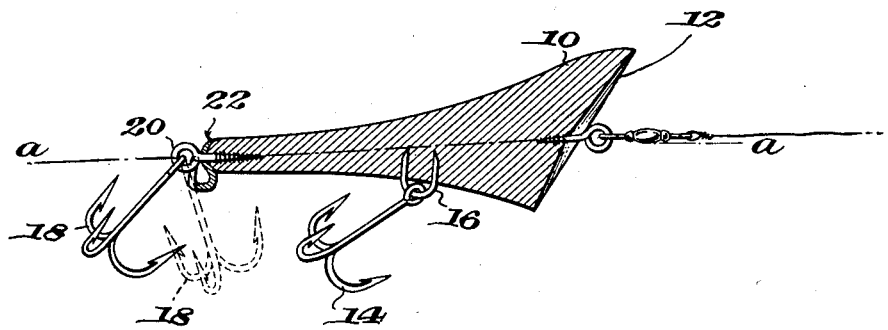
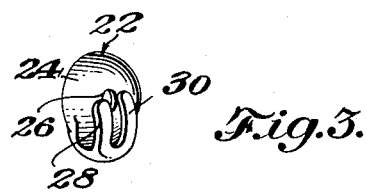
Inventor
R. W. Berry
By A. Yates Dowell
Attorney Patented June 6, 1950

2,510,769

UNITED STATES PATENT OFFICE 2,510,769

FISHING LURE

Robert W. Berry, California, Mo.

Application November 1, 1945, Serial No. 626,070

5 Claims. (Cl. 43—42.48)

This invention relates to improvements in fish lures or casting plugs and has particular reference to the type of plug or lure used largely in fishing for bass or similar game fish and which is drawn along the surface of the water in retrieving a cast.

In working with this type of lure and in observing the action of game fish such as bass I have noticed that they are more likely to strike at a lure that closely approximates the action in the water of an aquatic creature such as a frog, minnow or crawfish, which normally serve these fish for food and that at times, even when the bass are not feeding or striking at the usual lures they will frequently rise to an injured or wounded creature. I have also observed that such creatures as provide the normal food of bass and similar game fish when injured or wounded tend to progress along the surface of the water with erratic movements involving a moderate amount of splashing and paddling noises and at a relatively slow rate of speed.

Following these observations I have succeeded in producing a lure which, when drawn rather slowly through the water, tends to ride near or upon the water surface and to imitate to a remarkably close approximation the erratic movements, splashing and paddling noises of a wounded or injured aquatic creature of the type on which bass and similar game fish normally feed.

I also found, however, that since it is desirable to use a comparatively small lure or plug with two standard hooks spaced apart along the length thereof, it is not practical to space the hook attachment points sufficiently far apart to eliminate the possibility of the hooks becoming interengaged or fouled during the cast, thus causing a "dead" cast. This problem also has been overcome by the improved antifouling means hereinafter described in detail.

In view of the above considerations, it is an important object of the present invention to provide a casting plug or lure for bass and similar game fish which, when drawn through the water will simulate the erratic movements, paddling noises and splashing of an injured aquatic creature.

A further object resides in the provision of an improved casting plug or lure of simple and inexpensive construction which closely simulates the action in the water of an aquatic creature such as normally provide food for bass and similar game fish, without the use of feathers, bristles or other materials subject to injury and rapid deterioration.

A still further object resides in the provision in combination with a game fish casting plug or lure, having at least two standard hooks, of means positively restraining the hooks from becoming interengaged or fouled during a cast.

Other objects and advantages will become apparent from the following description when considered with the accompanying drawing, and from the appended claims.

In the accompanying drawing, in which like reference numerals are used to designate similar parts throughout:

Figure 1 is a perspective view of a casting plug or lure constructed according to the invention;

Figure 2 is a longitudinal sectional view of the casting lure illustrated in Figure 1; and, Figure 3 is a perspective view of an antifouling device constituting an operative part of the improved lure.

With continued reference to the drawing, the lure is preferably formed of a solid piece of bouyant material such as wood, a comparatively light, rot resisting wood such as red cedar being considered ideal for this purpose. The invention however is not limited to any specific material, the only limitations being that the material be durable and bouyant in fresh water.

For simplicity in description, the shape of the lure will be referred to in relation to a longitudinal axis $a-a$ as shown in Figures 1 and 2. The lure has an enlarged front end portion 10 terminating in a face 12 disposed at an angle to the longitudinal axis. The face 12 has a conical concavity as is clearly shown in the drawing.

In perfecting a lure that would closely simulate the erratic actions of an injured or wounded small aquatic creature I found that the tail portion of the lure should be very slender in proportion to the area of the front face 12 and that the length should be short in relation to the front face area.

For example, a lure having a front face diameter of from 1⅛ inches to 1¼ inches a tail end diameter of approximately ⅜ inch and a length of approximately 3 inches has been found to give very satisfactory results. The slender tail portion should, however, increase in size very gradually from the tail end toward the front end portion. Thus, it will be seen from the sectional view in Figure 2 that the bottom line is a slightly curved line having its greatest amount of curvature in the front end portion of the lure and that the top line has a reverse curvature with relation to the curvature of the bottom line having a curved portion of small diameter over the overhang of the angularly disposed front face and a portion of less curvature, i. e. of greater radius over the remainder of its length corresponding to the length of the bottom line.

The lure is of substantially circular cross section in planes perpendicular to the longitudinal axis at all stations along the longitudinal axis but the front face 12, because of its angular relationship to the longitudinal axis, is somewhat elliptical in shape.

Stated in another way, the body portion of the lure may be described as having the shape of a body of revolution generated by revolving about the longitudinal axis $a$—$a$ a curved line having a relatively flat concave portion disposed at a short radial distance from the longitudinal axis and at a slight angle of divergence thereto, and a sharply curved convex portion to give the lure a slender gradually tapered tail end portion and a rounded front end portion, the two end portions of said line being substantially parallel to said axis, and intersecting the front end portion with a concave face disposed at an accute angle to said longitudinal axis.

This specific shape of plug or lure enables the user to easily and closely simulate with the lure the action of a wounded or injured aquatic creature of the character referred to. When still in the water the lure stands in a substantially upright position and when drawn slowly through the water it has an erratic wiggling action. Also a very slight jerk or twitch of the line will cause the lure to submerge with a slight popping noise such as might be made by a small aquatic creature.

The most similar prior art lure of which I am aware must be drawn rapidly through the water to produce any wiggling movement and the movement then is not sufficiently erratic to simulate the action of a wounded or injured creature; and can be submerged only by a relatively violent jerk on the line producing a loud noise similar to that produced by tossing a sizeable stone into the water.

A hook 14 is secured to the plug by a staple, screweye or other suitable fastener 16. The fastener 16 is located in the bottom or shortest side of the plug forward of the mid length of the plug and near the junction of the front and tail end portions. This location is carefully selected to give the proper balance to the lure for casting and the desired action when the lure is trailed through the water. A second hook 18 is secured to the plug by a fastener such as the screweye 20 screwed into the tail end of the plug substantially along the axis $a$—$a$. The combination of the length of the hooks and the distance between the fasteners 16 and 20 is such that if both hooks are entirely free the barbed ends may overlap and interengage resulting in a fouled lure. I have found this to be true not only with the improved lure described above but also with many lures already on the market and it is to be understood that my improved antifouling device, presently to be described, is not limited to use with the improved lure of this invention but may be applied to other lures or plugs without in any way exceeding the scope of the invention.

The antifouling device, particularly illustrated in Figures 2 and 3, comprises a metal element, generally indicated at 22, having a cup-shaped portion 24 shaped to fit the rounded tail end of the lure and provided with a substantially central aperture 26 for reception of the shank of the fastener 20.

A radial extension of the cup-like portion is bifurcated and bent back to provide a pair of prongs 28 and 30 having their ends disposed one at each side of the aperture 26 and including between them a slot extending downwardly from the aperture. When the antifouling device is applied to a lure the prongs 28 and 30 lie one at each side of the screweye 20 and restrain the screweye against turning and becoming loosened. The looped over portion of the radial extension carrying the prongs contacts the shank of the hook 18 and limits the forward movement of the hook to a position, as indicated by the dotted line position of the hook 18 in Figure 2, in which the hook 18 cannot engage or foul the hook 14.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a fishing lure having a small end and a large end, two hooks attached thereto, one of said hooks being connected to a screweye threaded into the small end of said lure and the other hook being attached to said lure intermediate its length and at a distance from said one hook less than the combined lengths of said two hooks; an antifouling device comprising a metal element having an apertured cup-shaped portion fitted over the small end of said lure with said screweye extending through said aperture, and a bent up radial extension on said cup-shaped portion providing an abutment for limiting movements of said one hook toward the other hook and having a bifurcated portion providing a pair of prongs disposed one at each side of the eye portion of said screweye to restrain said screweye against loosening.

2. An antifouling device for fish lure hooks comprising a metal member having a centrally apertured cup-shaped portion and a bent up radial extension on said cup-shaped portion bifurcated at its end to provide a pair of prongs disposed, one at each side of said aperture.

3. In combination with a fishing lure having two hooks attached thereto at points spaced a distance less than the combined length of said hooks, one of said hooks being secured to one end portion of said lure, antifouling means on said one end portion of said lure and operatively associated with said one hook to limit the movement of said one hook toward the other hook, said antifouling means comprising a metal member having a cup-shaped portion fitting the associated end portion of said lure, and bent up radial extensions on one side thereof for engagement with said one hook.

4. In combination with a fishing lure having a small end and a large end, two hooks attached thereto, one of said hooks being connected to a screweye threaded into the small end of said lure and the other hook being attached to said lure intermediate its length and at a distance from said one hook less than the combined lengths of said two hooks; an antifouling device comprising a metal element having an apertured portion fitted over the small end of said lure with said screweye extending through said aperture, and a bent up radial extension on said portion providing an abutment for limiting movement of said one hook toward the other hook and having a bifurcated portion providing a pair of prongs disposed one at each side of the eye portion of said screweye to restrain said screweye against loosening.

5. An antifouling device for fish lure hooks comprising a metal member having a centrally apertured portion and a bent up radial extension on said portion bifurcated at its end to provide a pair of prongs disposed, one at each side of said aperture.

ROBERT W. BERRY.

REFERENCES CITED

The following references are of record in the file of this patent:

UNITED STATES PATENTS

| Number | Name | Date |
| --- | --- | --- |
| 1,009,077 | Lockhart | Nov. 21, 1911 |
| 1,977,141 | Pflueger | Oct. 16, 1934 |
| 2,261,867 | Arbogast | Nov. 4, 1941 |
| 2,262,974 | Steiner | Nov. 18, 1941 |
| 2,429,339 | Arbogast | Oct. 21, 1947 |